United States Patent [19]

MacGugan et al.

[11] Patent Number: 4,620,442

[45] Date of Patent: Nov. 4, 1986

[54] DIGITAL ACCELEROMETER

[75] Inventors: Douglas C. MacGugan, Issaquah; Ronald B. Leonardson, Redmond; William W. Sand, Kirkland, all of Wash.

[73] Assignee: Sundstrand Data Control, Inc., Seattle, Wash.

[21] Appl. No.: 620,441

[22] Filed: Jun. 14, 1984

[51] Int. Cl.[4] .............................................. G01P 15/08
[52] U.S. Cl. ................... 73/517 R; 73/497; 73/431
[58] Field of Search ............... 73/497, 503, 517 R, 73/517 B, 517 AV, 516 R, 516 LM, 431; 361/398, 408

[56] References Cited

U.S. PATENT DOCUMENTS

| 3,039,177 | 6/1962 | Burdett | 361/398 |
|---|---|---|---|
| 3,105,869 | 10/1963 | Branch et al. | 361/408 |
| 3,390,286 | 6/1968 | Gradin et al. | 73/517 R |
| 3,643,513 | 2/1972 | Weaver | 73/517 R |
| 3,873,889 | 3/1975 | Leyba | 361/398 |
| 4,102,202 | 7/1978 | Ferriss | 73/517 B |
| 4,114,450 | 9/1978 | Shulman et al. | 73/517 R |
| 4,360,858 | 11/1982 | Fahling | 361/398 |

Primary Examiner—Jerry W. Myracle
Assistant Examiner—John E. Chapman, Jr.
Attorney, Agent, or Firm—Christensen, O'Connor, Johnson & Kindness

[57] ABSTRACT

A digital accelerometer comprising a linear analog accelerometer and a digitizer. The analog accelerometer includes a housing and conductor means extending outside the housing, and is adapted to produce on the conductor means an analog signal representing linear acceleration along one axis. A casing is positioned against the housing so as to form a substantially enclosed space between the housing and the casing. The digitizer is located within such enclosed space and receives the analog signal and produces a corresponding digital signal. An interface circuit is positioned within the enclosed space for receiving the analog signal and producing a second analog signal that is input to the digitizer. The digital signal produced by the digitizer may be conveyed to a location outside the enclosed space and housing by a flexible strip of insulating material having a plurality of conductive strips embedded therein. In a preferred embodiment, the interface circuit is operative to determine the magnitude of the second analog signal resulting from a particular first analog signal, whereby the dynamic range of the digital accelerometer can be modified by modifying only the interface circuit.

7 Claims, 5 Drawing Figures

DIGITAL ACCELEROMETER

TECHNICAL FIELD

The present invention relates to digital accelerometers and, more particularly, to an analog linear accelerometer and a digitizer combined in a single, compact unit.

BACKGROUND OF THE INVENTION

Linear accelerometers are commonly used as components of inertial reference systems for airborne, shipboard and drilling applications. The role of a linear accelerometer in such a system is to provide a signal representing accelerations or velocity changes along an axis, which signal is typically input into a system computer. One widely used accelerometer produces an analog current signal that is proportional to linear acceleration along the accelerometer's sensitive axis. To be usable by the system computer, such an analog acceleration signal must be digitized and preferably integrated to produce a digital signal representing velocity changes. Synchronous operation of the accelerometer/digitizer combination is required because the data collection, correction, and navigation computations are done in real time, and no data can be lost as would be the case if a high-speed A/D converter was used.

Prior accelerometer/digitizer designs have used a separately housed analog accelerometer connected by an electrical cable to a circuit board containing the digitizer. Complete inertial reference systems include three such analog accelerometers and three such circuit boards. Since both the analog accelerometers and the digitizers are sensitive to temperature, the control and prediction of temperature gradients under all possible environmental conditions for such systems can be quite difficult. Although the accelerometer and the digitizer can be separately calibrated with respect to temperature, trimming is invariably required when the components are assembled into a complete system. In addition, the space, weight and power requirements of analog accelerometers and digitizers are considerable, and are important considerations in airborne applications. In spite of the above, prior accelerometers and digitizers have not generally been combined in a single, closed housing, in part because of the inflexibility that would result from such an arrangement. For example, most accelerometer/digitizer designs have a certain dynamic range which can be modified only by changing or switching one or more electronic components. Thus, an accelerometer/digitizer design, with prior components, would be incapable of serving in both high acceleration applications, such as missle guidance systems, and low acceleration applications such as space applications.

SUMMARY OF THE INVENTION

The present invention overcomes the aforesaid difficulties by providing an integral, digital accelerometer that is contained in a single, compact unit that consists of separate analog accelerometer and digitizer subunits which can readily be combined and separated. By use of a single, compact unit, temperature gradients are reduced and controlled, and the device can be calibrated and modeled as a single unit. However, by including an appropriate interface means within the unit between the analog accelerometer and digitizer subunits, the dynamic range of the device can readily be altered.

The digital accelerometer of the present invention comprises a linear analog accelerometer having a housing and conductor means extending outside the housing, a casing positioned against the housing so as to form a substantially enclosed space between the housing and the casing, an interface means and a digitizer located within the enclosed space. The analog accelerometer is adapted to produce on the conductor means a first analog signal representing the linear acceleration of the analog accelerometer along one axis thereof. The interface means receives the first analog signal and produces a corresponding second analog signal. The digitizer receives the second analog signal and produces a corresponding digital signal, which may be conveyed to a location outside the enclosed space and the housing. In a preferred embodiment, the interface means includes an interface circuit operative to determine the magnitude of the second analog signal resulting from a particular first analog signal. Thus by modifying only the interface circuit, the dynamic range of the digital accelerometer can be modified.

In another aspect of the present invention, the digital accelerometer comprises a linear analog accelerometer having a housing and conductor means extending outside the housing, a casing positioned against the housing so as to form a substantially enclosed space between the housing and the casing, a digitizer located within the enclosed space for receiving an analog signal from the analog accelerometer and producing a corresponding digital signal, and means for conveying the digital signal to a location outside the enclosed space and housing. The means for conveying the digital signal to such location may comprise a flexible strip of insulating material having embedded therein a plurality of conductive strips. First, second and third sets of terminals are positioned along the length of the flexible strip for connection to an external device, to the analog accelerometer, and to the digitizer, respectively. The second and third sets of terminals are located within the enclosed space. The flexible strip may include two bends of approximately 180° each between the second and third sets of terminals, such that a portion of the flexible strip between the second and third sets of terminals is positioned between the analog accelerometer and the digitizer.

These and other features and advantages of the invention will be apparent in the detailed description and claims to follow, taken in conjunction with the accompanying drawings.

DETAILED DESCRIPTION OF THE INVENTION

Figure 1:
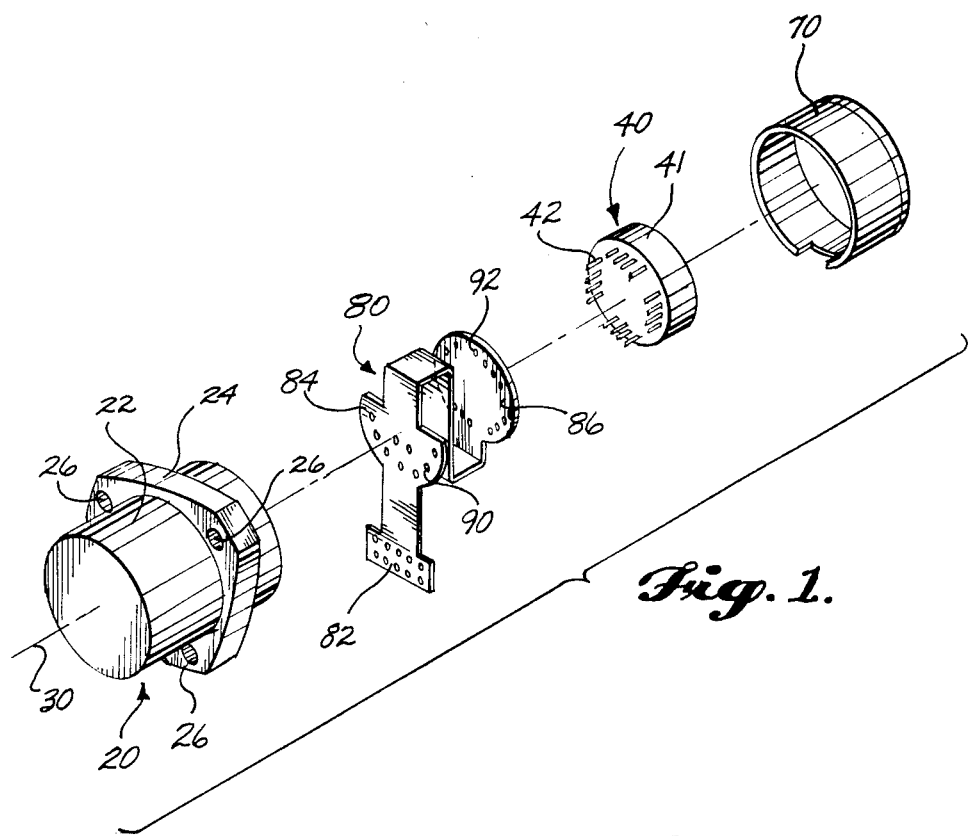
FIG. 1 is an exploded, perspective view of the digital accelerometer of the present invention.
Figure 2:
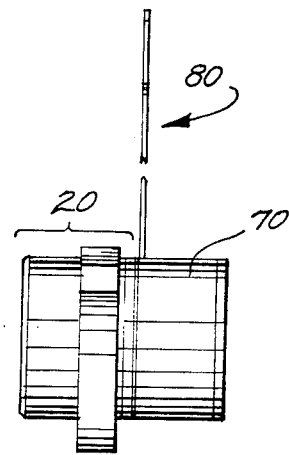
FIG. 2 is a side elevational view of the assembled digital accelerometer.

Referring initially to FIGS. 1 and 2, a preferred embodiment of the digital accelerometer of the present invention is shown as comprising linear analog accelerometer 20, digitizer 40, casing 70 and flexible connector 80. When the digital accelerometer is assembled, the casing is positioned against the analog accelerometer to form an enclosed space within which digitizer 40 and a portion of flexible connector 80 are mounted. An interface circuit comprising resistor R1 and capacitor C1 (FIGS. 3 and 4) is also mounted within the enclosed space. Flexible connector 80 extends through an opening in casing 70, as described below, and serves to provide electrical connections between the analog accelerometer, digitizer, and interface circuit subunits, as well as to convey electrical signals between such subunits and external devices.

Figure 3:
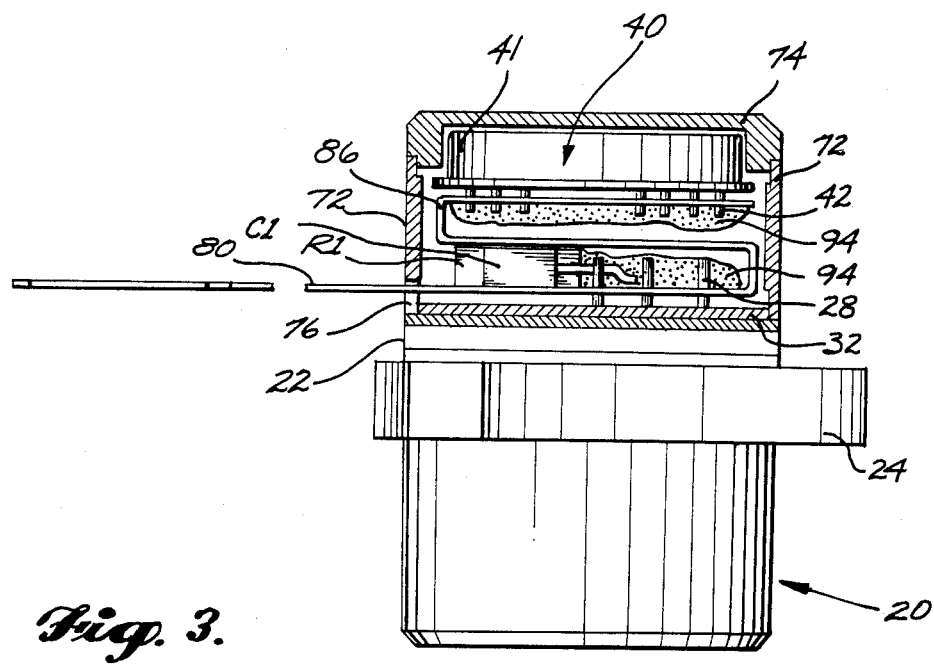
FIG. 3 is a side elevational view of the digital accelerometer, with portions broken away.

Analog accelerometer 20 comprises a cylindrical body 22 and an integral, triangular mounting flange 24. Flange 24 includes three mounting holes 26 for mounting the digital accelerometer to an instrument package. The sensitive axis of the accelerometer is indicated by line 30. Referring to FIG. 3, one end of cylindrical body 22 includes a reduced diameter portion 32 from which a plurality of pins extend, one such pin being indicated by numeral 28. Such pins serve to provide for electrical connection between the analog accelerometer and other devices as described below.

Digitizer 40 comprises a hybrid circuit, described in greater detail below. The digitizer is contained within body 41 from which a plurality of pins extend, one such pin being indicated by numeral 42.

Casing 70 comprises cylindrical sleeve 72 and end cap 74, as best illustrated in FIG. 3. End cap 74 is shaped to receive digitizer 40, and the digitizer may be secured in the end cap by heat conductive adhesive or by other suitable means. Sleeve 72 is sized so as to provide a tight, heat conductive fit between the sleeve and reduced diameter portion 32 of cylindrical body 22 of the analog accelerometer. By such means, a compact, integral unit is created, and a good heat conduction path is maintained between the analog accelerometer and the digitizer, thereby keeping temperature gradients to a minimum. A small portion of sleeve 72 is cut away to provide opening 76 through which flexible connector 80 passes.

Flexible connector 80 provides for electrical connections between the analog accelerometer, the digitizer and the interface circuit, as well as electrical connections between such subunits and external devices. The flexible connector comprises a strip of tape on which a plurality of electrical conducting strips have been etched. Flexible connector 80 includes a generally rectangular first end portion 82 having a plurality of terminals 88, a semicircular central portion 84 having terminals 90, and a circular second end portion 86 having terminals 92. Terminals 88, 90 and 92 each comprises an exposed conductive patch having a small opening therein for receiving a pin. As best indicated in FIG. 3, when the digital accelerometer of the present invention is fully assembled, flexible connector 80 takes on a generally flattened S shape with analog accelerometer 20 connected to flexible connector 80 at central portion 84 and digitizer 40 connected to flexible connector 80 at second end portion 86. The pins of analog accelerometer 20, such as pin 28, are connected to flexible connector 80 through terminals 90, and the pins of digitizer 40, such as pin 42, are connected to flexible connector 80 through terminals 92. Also connected to terminals 90 is the interface circuit comprising resistor R1 and capacitor C1. Terminals 88 of flexible connector 80 are used to interconnect the present invention with other devices in an inertial reference system. Insulating adhesive material 94 is placed over the portions of the analog accelerometer and digitizer pins that extend through the flexible connector.

Figure 5:
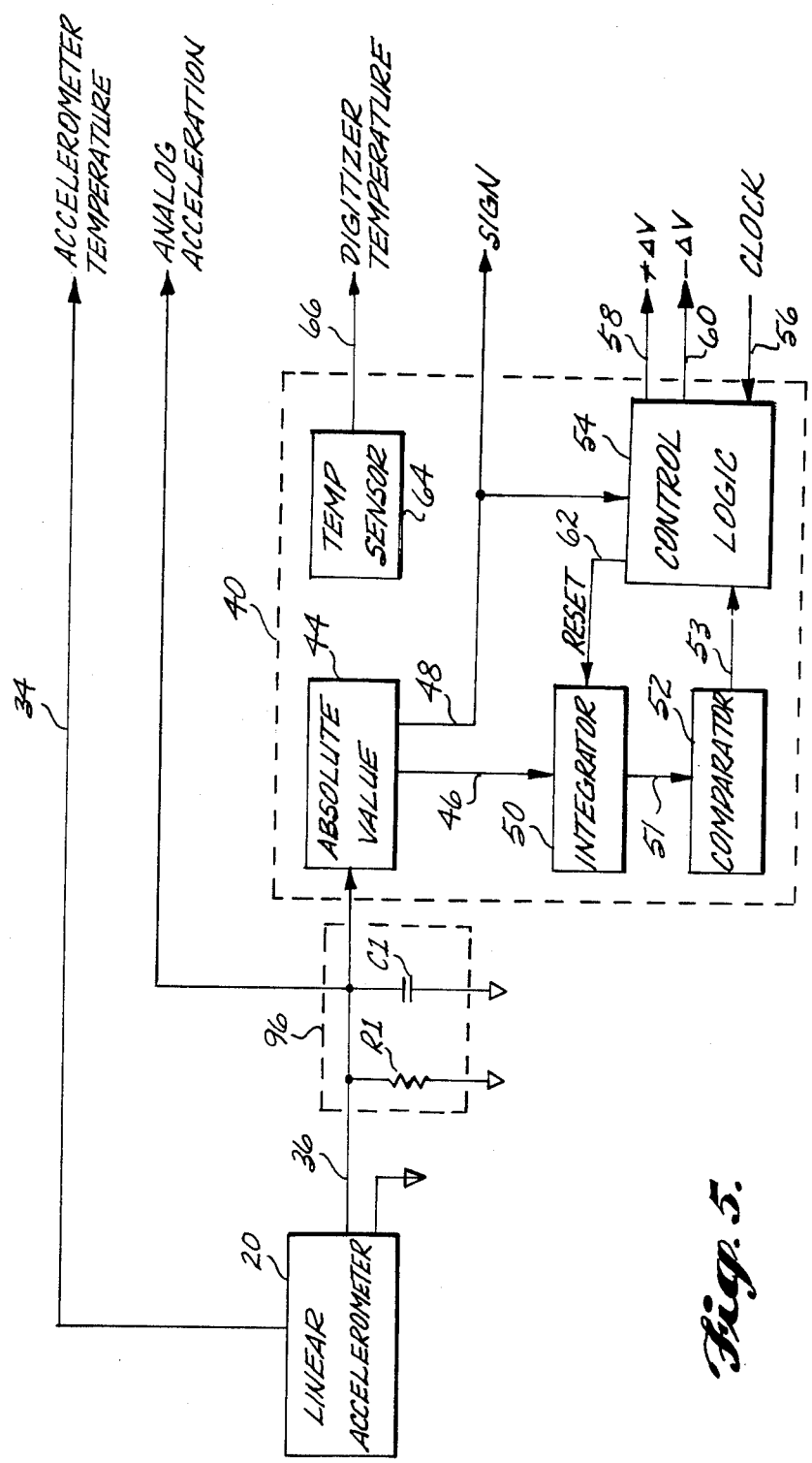
FIG. 5 is an electrical block diagram of the digital accelerometer.

FIG. 5 shows an electrical block diagram of the digital accelerometer of the present invention. In FIG. 5, the signal lines shown at the right-hand side of the figure (e.g. ACCELEROMETER TEMPERATURE) represent connections to external devices through terminals 88 of flexible connector 80. Linear accelerometer 20 produces an analog current signal on line 36 whose magnitude is proportional to the acceleration experienced by accelerometer 20 along axis 30. This analog current signal is converted to a corresponding analog voltage signal by interface circuit 96 comprising resistor R1 and capacitor C1. The resulting analog voltage signal (ANALOG ACCELERATION) is output through flexible connector 80, and also input to digitizer 40. The magnitude of resistor R1 determines the ratio between the analog current signal on line 36 and the ANALOG ACCELERATION voltage signal, and is selected based upon the required dynamic range of the digital accelerometer. Interface circuit 96 also includes a low-pass filter consisting of capacitor C1 to eliminate any high frequency noise components that may be present.

The function of digitizer 40 is to convert the ANALOG ACCELERATION signal into digital output signals $+\Delta V$ and $-\Delta V$. The $+\Delta V$ signal consists of a series of pulses, each pulse representing a specified increment in velocity in one direction along axis 30. Similarly the $-\Delta V$ signal consists of a series of pulses, each representing a specified increment in velocity in the opposite direction along axis 30. Digitizer 40 consists of absolute value circuit 44, integrator 50, comparator 52 and control logic circuit 54. The ANALOG ACCELERATION signal is input into absolute value circuit 44, which responds by providing a signal on line 46 representing the magnitude of the ANALOG ACCELERATION signal, and a signal on line 48 representing its sign, i.e., the direction of acceleration along axis 30. The SIGN signal on line 48 is available to external devices through flexible connector 80. The magnitude signal on line 46 is input into integrator 50. Integrator 50 provides a signal on line 51 corresponding to the integral of the magnitude signal on line 46. When the magnitude of the signal on line 51 (i.e., the time integral of the acceleration) exceeds a preselected value, comparator 52 sends a trigger signal on line 53 to control logic circuit 54.

Control logic circuit 54 receives a continuous CLOCK signal on line 56 from an external device via flexible connector 80. In response to each trigger signal from comparator 52, control logic circuit 54 outputs a pulse on either line 58 or line 60, and also sends a RESET signal to integrator 50 via line 62 to cause the integrator to begin a new integration. Control logic circuit 54 selects between line 58 and 60 based upon the sign signal received from absolute value circuit 44. For example, if the signal on line 48 indicates that the ANALOG ACCELERATION signal is positive, control logic circuit 54 will output a pulse on line 58 when integrator 50 accumulates a prescribed integral value for the acceleration. Similarly, when the signal on line 48 indicates that the ANALOG ACCELERATION signal is negative, control logic circuit 54 will output a pulse on line 60 when integrator 50 accumulates the prescribed integral value. The pulses output by control logic 54 on lines 58 and 60 are synchronized with the clock pulses on line 56. In one preferred embodiment, the pulses on line 58 and 60 are synchronized with the leading edges of such clock pulses, such that the maximum frequency of the $+\Delta V$ and $-\Delta V$ signals is one half of the CLOCK frequency.

The dynamic range of the digital accelerometer of the present invention can conveniently be set by selecting particular values for resistor R1. As previously described, the value of R1 determines the ratio between the analog current signal from analog accelerometer 20 and the ANALOG ACCELERATION signal applied to digitizer 40. The frequency of the clock signal determines the maximum pulse output rate on lines 58 and 60, and thus determines the sensitivity of the digital accelerometer.

Figure 4:
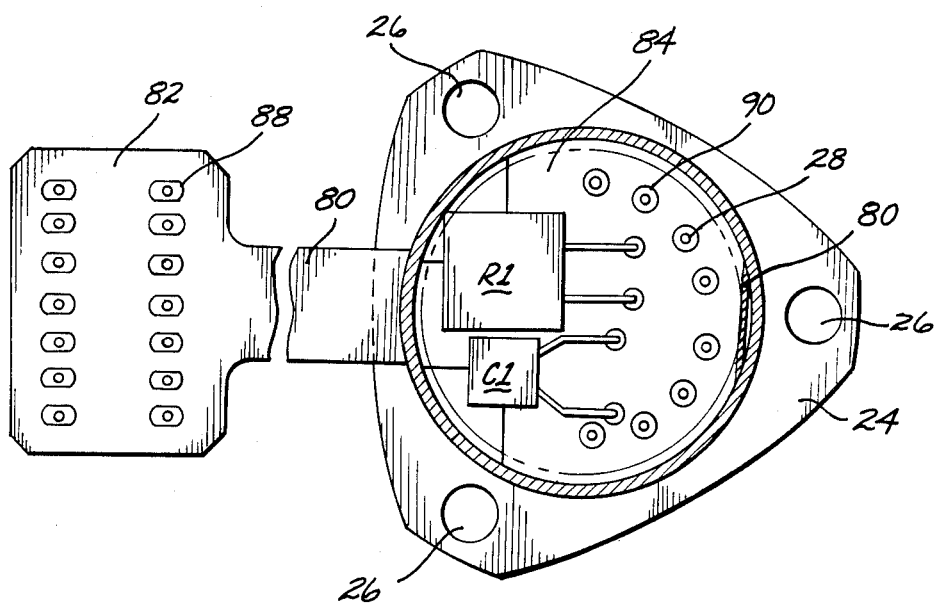
FIG. 4 is a cross-sectional view of the digital accelerometer showing the connections to the analog accelerometer.

As indicated in FIGS. 3 and 4, resistor R1 and capacitor C1 are mounted in the enclosed space between casing 70 and analog accelerometer 20. These components, therefore, can readily be changed in order to modify the dynamic range of the digital accelerometer. Nevertheless, these components are mounted in the same unit with the remaining subunits of the digital accelerometer, and are therefore subject to predictable temperature changes with respect to the remainder of the unit. The accessibility of these components therefore does not detract from the reliability or ease of calibration of the digital accelerometer of the present invention.

Analog accelerometer 20 includes an internal temperature sensor (not shown). Such temperature sensor produces an ACCELEROMETER TEMPERATURE signal on line 34 (FIG. 5) which is available to external devices via flexible connector 80. In a similar manner, digitizer 40 includes an internal temperature sensor 64 which produces a DIGITIZER TEMPERATURE signal on line 66 representative of the temperature within the digitizer. Both the accelerometer and digitizer temperature signals can be input into a system computer which can apply such temperature signals to predetermined models and adjust the velocity signals received over lines 58 and 60 accordingly.

It will be understood that the present invention may be embodied in other specific forms without departing from the central characteristics thereof. The present examples and embodiments are therefore to be considered in all respects as illustrative and not restrictive, and the invention is not to be limited to the details given herein, but may be modified within the scope of the following claims.

The embodiments of the invention in which an exclusive property or privilege is claimed are defined as follows:

1. A digital accelerometer comprising:
   a linear analog accelerometer comprising a first self-contained modular unit enclosed within a housing and a conductor extending from within the housing to a point outside the housing, the analog accelerometer being adapted to produce on the conductor a first analog signal representing the linear acceleration of the analog accelerometer along one axis thereof;
   a casing positioned against the housing so as to form a substantially enclosed space between a portion of the housing adjacent the conductor and the casing;
   an interface circuit located within the enclosed space for receiving the first analog signal and producing a second analog signal having a magnitude corresponding to the magnitude of the first analog signal, the interface circuit comprising one or more electrical components mounted such that the components are accessible when the casing is separated from the housing;
   a digitizer comprising a second self-contained modular unit located within the enclosed space for receiving the second analog signal and producing a corresponding digital signal; and
   connector means for conveying signals between the analog accelerometer, interface circuit, digitizer and a location outside the enclosed space and the housing, the connector means comprising a single, continuous flexible strip of insulating material having embedded therein a plurality of conductive strips, the flexible strip passing through an opening in the casing, the flexible strip further including first, second and third sets of terminals positioned at spaced apart locations along the length of the flexible strip, the first set of terminals being located outside the casing and being adapted for connecting the digital accelerometer to an external device, the second and third sets of terminals being located inside the casing and being connected to the analog accelerometer and digitizer, respectively;
   whereby the first and second modular units are maintained in close thermal contact with one another during operation of the digital accelerometer, and whereby the dynamic range of the digital accelerometer can nevertheless be readily modified by separating the casing from the housing and modifying said one or more components.

2. The digital accelerometer of claim 1, wherein the first analog signal comprises an electrical current whose magnitude is proportional to the acceleration, and wherein the second analog signal comprises a voltage signal whose magnitude is proportional to the magnitude of the first analog signal.

3. The digital accelerometer of claim 2, wherein said one or more components comprises a resistor connected to pass said electrical current, the voltage signal comprising the voltage drop across the resistor, whereby the dynamic range of the digital accelerometer can be modified by only modifying the resistor.

4. The digital accelerometer of claim 1, wherein the analog accelerometer includes a second conductor extending from within the housing to a second point outside the housing, the analog accelerometer including means for producing on the second conductor an accelerometer temperature signal representing the temperature within the housing, wherein the digitizer includes means for producing a digitizer temperature signal representing the temperature within the digitizer, and wherein the connector means includes means for conveying the accelerometer temperature signal and the digitizer temperature signal to the location outside the enclosed space and housing.

5. The digital accelerometer of claim 1, wherein the flexible strip includes two bends of approximately 180° each between the second and third sets of terminals, whereby a portion of the flexible strip between the second and third sets of terminals is positioned between the analog accelerometer and the digitizer.

6. The digital accelerometer of claim 5, wherein said one or more components are mounted between said portion of the flexible strip and a second portion of the flexible strip adjacent the second set of terminals.

7. The digital accelerometer of claim 6, wherein the first analog signal comprises an electrical current whose magnitude is proportional to the acceleration, wherein said one or more components comprises a resistor for converting the first analog signal into the second analog signal.

* * * * *